United States Patent
Choi et al.

(10) Patent No.: US 10,664,122 B2
(45) Date of Patent: May 26, 2020

(54) APPARATUS AND METHOD OF DISPLAYING WINDOWS

(71) Applicant: Samsung Electronics Co., Ltd., Suwon-si, Gyeonggi-do (KR)

(72) Inventors: Jung-hwan Choi, Seoul (KR); Young-jin Kim, Suwon-si (KR); Kang-tae Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 14/587,246

(22) Filed: Dec. 31, 2014

(65) Prior Publication Data

US 2015/0220215 A1    Aug. 6, 2015

(30) Foreign Application Priority Data

Feb. 5, 2014  (KR) .................. 10-2014-0013318

(51) Int. Cl.
*G06F 3/0481* (2013.01)
*G06F 3/0488* (2013.01)

(52) U.S. Cl.
CPC ........ *G06F 3/0481* (2013.01); *G06F 3/04883* (2013.01); *G06F 2203/04803* (2013.01)

(58) Field of Classification Search
CPC .............. G06F 3/0481; G06F 3/04886; G06F 2203/04803; G06F 3/04883; G06F 3/04845; H04M 1/72583
See application file for complete search history.

(56) References Cited

U.S. PATENT DOCUMENTS

| | | | | |
|---|---|---|---|---|
| 6,075,531 | A | * | 6/2000 | DeStefano .......... G06F 3/04812 715/788 |
| 8,351,995 | B2 | | 1/2013 | Dobroth et al. |
| 9,176,612 | B2 | | 11/2015 | Paihonen et al. |
| 2002/0101925 | A1 | * | 8/2002 | Zettsu ..................... G09G 5/14 375/240.08 |

(Continued)

FOREIGN PATENT DOCUMENTS

| CN | 102968243 A | 3/2013 |
|---|---|---|
| CN | 103425431 A | 12/2013 |

(Continued)

OTHER PUBLICATIONS

Chinese Office Action dated Jan. 16, 2019, issued in a counterpart Chinese application No. 201480076839.1.

*Primary Examiner* — Stella Higgs
(74) *Attorney, Agent, or Firm* — Jefferson IP Law, LLP

(57) ABSTRACT

A method of displaying windows is provided. The method includes displaying at least two windows, displaying at least one center button disposed at at least one boundary between the at least two displayed windows, determining a window of which the size is to be changed according to a movement direction of the at least one center button, and changing a size of the determined window according to movement of the at least one center button and displaying the determined window having the changed size, wherein the determined window is overlaid on the at least two displayed windows, and wherein a size of the determined window is changed according to movement of the at least one center button.

20 Claims, 8 Drawing Sheets

(56) References Cited

U.S. PATENT DOCUMENTS

| | | | |
|---|---|---|---|
| 2005/0138568 A1* | 6/2005 | Gilfix | G06F 1/1626 |
| | | | 715/788 |
| 2007/0016875 A1 | 1/2007 | Santos-Gomez | |
| 2007/0192730 A1* | 8/2007 | Simila | G06F 3/0481 |
| | | | 715/788 |
| 2010/0313165 A1* | 12/2010 | Louch | G06F 3/0481 |
| | | | 715/792 |
| 2011/0105187 A1* | 5/2011 | Dobroth | G06F 3/0481 |
| | | | 455/566 |
| 2011/0175930 A1* | 7/2011 | Hwang | G06F 3/0481 |
| | | | 345/629 |
| 2012/0144331 A1* | 6/2012 | Tolonen | G06F 3/0484 |
| | | | 715/769 |
| 2013/0187874 A1* | 7/2013 | Nettamo | G06F 3/041 |
| | | | 345/173 |
| 2014/0215387 A1* | 7/2014 | Kuscher | G06F 3/04845 |
| | | | 715/800 |
| 2015/0220215 A1 | 8/2015 | Choi et al. | |

FOREIGN PATENT DOCUMENTS

| | | |
|---|---|---|
| EP | 2328062 A2 | 6/2011 |
| EP | 2608010 A2 | 6/2013 |
| JP | 11-134159 A | 5/1999 |
| JP | 2007-328809 A | 12/2007 |
| WO | 2005/091123 A1 | 9/2005 |
| WO | 2010/035162 A2 | 4/2010 |

\* cited by examiner

APPARATUS AND METHOD OF DISPLAYING WINDOWS

CROSS-REFERENCE TO RELATED APPLICATION(S)

This application claims the benefit under 35 U.S.C. § 119(a) of a Korean patent application filed on Feb. 5, 2014 in the Korean Intellectual Property Office and assigned Serial number 10-2014-0013318, the entire disclosure of which is hereby incorporated by reference.

TECHNICAL FIELD

The present disclosure relates to an apparatus and a method of displaying a plurality of windows.

BACKGROUND

Electronic devices may include a display unit. A user may select various functions while watching a screen displayed on a display unit of an electronic device.

The user may use the screen by splitting the screen of the display unit based on a working environment. Since a mobile device has a small screen size to be displayed and a limitation in input, it is difficult for the user to split the screen.

Also, since the mobile device is manufactured to have a portable size, there is a limitation in the size of a display and a user interface of the mobile device, and thus there is user inconvenience when executing a plurality of applications in the mobile device.

Thus, the plurality of applications or application execution windows need to be displayed in such a way that the user may use them conveniently in an environment in which there is a limitation in the size of a display screen, like in the mobile device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method of displaying a plurality of windows including a plurality of applications and/or application execution windows in a mobile device in which there is a limitation in a size of a display screen, in such a way that a user may use the mobile device conveniently.

In accordance with an aspect of the present disclosure, a method of displaying windows is provided. The method includes displaying at least two windows, displaying at least one center button disposed at at least one boundary between the at least two displayed windows, determining a window of which the size is to be changed, according to a movement direction of the at least one center button, and changing a size of the determined window according to movement of the at least one center button and displaying the determined window having the changed size, wherein the determined window is overlaid on the at least two displayed windows, and wherein a size of the determined window is changed according to movement of the at least one center button.

In accordance with another aspect of the present disclosure, a terminal device is provided. The terminal device includes a display unit configured to display at least two windows and at least one center button disposed at at least one boundary between the at least two displayed windows, a controller configured to determine a window of which the size is to be changed according to a movement direction of the at least one center button and to change a size of the determined window according to movement of the at least one center button and to display the determined window having the changed size, and an input unit configured to receive an input for moving the at least one center button, wherein the determined window is overlaid on the at least two displayed windows, and wherein a size of the determined window is changed according to movement of the at least one center button.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
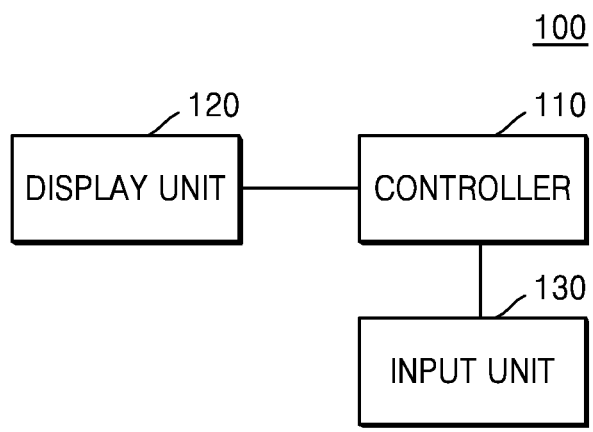
FIG. 1 is a block diagram of an internal configuration of a terminal device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When a unit "comprises" an element, as described in the disclosure, the unit does not exclude another element but may further comprise another element unless the context clearly indicates otherwise. In addition, terms such as " . . . unit", "module", and the like used herein indicate a unit for performing at least one function or operation and may be implemented by hardware or software or a combination thereof.

In the present disclosure, a "gesture" means a sign used by a user to control mobile terminal equipment. For example, a gesture described herein may include tap and drag.

"Tap" indicates an operation in which the user touches a screen quickly by using a finger or a touch instrument, such as a stylus pen. That is, "tap" indicates the case where a time difference between a touch-in time when the user's finger or touch instrument contacts the screen and a touch-out time when the user's finger or touch instrument is taken off the screen is very short.

"Drag" indicates an operation in which the user touches the screen by using a finger or a touch instrument and moving the finger or touch instrument to another position on the screen while maintaining contact between the finger or touch instrument and the screen. When a drag operation is performed, an object may be moved, or a panning operation that is described below is performed.

The present disclosure will now be described more fully with reference to the accompanying drawings in which various embodiments of the present disclosure are shown. The present disclosure may, however, be embodied in many different forms and should not be construed as being limited to the embodiments set forth herein. Rather, these embodiments are provided so that the present disclosure will be thorough and complete, and will fully convey the concept of the present disclosure to those skilled in the art. For clarity, in the drawings, irrelevant portions with respect to the description of the present disclosure are omitted, and similar reference numbers are added to similar portions throughout the entire specification.

Hereinafter, various embodiments of the present disclosure will be described with reference to the accompanying drawings.

FIG. 1 is a block diagram of an internal configuration of a terminal device according to an embodiment of the present disclosure.

A terminal device 100 may include units having various shapes that a user may use. For example, the terminal device 100 may include a personal computer (PC), a notebook computer, a mobile phone, a tablet PC, navigation terminal equipment, a smart phone, a personal digital assistant (PDA), a portable multimedia player (PMP), and a digital broadcasting receiver. However, the present disclosure is not limited thereto, and the terminal device 100 may include all electronic devices and/or communication devices that have been currently developed and are commonly used or will be developed in the future.

Referring to FIG. 1, the terminal device 100 according to an embodiment of the present disclosure may include a controller 110, a display unit 120, and an input unit 130. However, all illustrated elements are not essential elements. The terminal device 100 may be implemented by more or less elements than the number of illustrated elements.

Hereinafter, the above-described elements will be described.

The controller 110 controls an overall operation of the terminal device 100. The controller 110 of the terminal device 100 may perform control and processing for displaying a plurality of windows according to an input of the input unit 130. That is, the controller 110 may control an overall operation of the display unit 120 and the input unit 130.

The display unit 120 may display and output information processed by the terminal device 100. For example, the display unit 120 may display a user interface (UI) and/or a graphical user interface (GUI) for displaying a plurality of windows.

When the display unit 120 and a touch pad (not shown) constitute a layered structure and are configured to operate as a touch screen (not shown), the display unit 120 may be used as both an output unit and an input unit. The display unit 120 may include at least one among a liquid crystal display (LCD), a thin film transistor-liquid crystal display (TFT-LCD), an organic light-emitting diode (OLED) display, a flexible display, a three-dimensional (3D) display, or any other similar and/or suitable type of display. Two or more display units 120 may be included in the terminal device 100 according to an embodiment of the present disclosure. The touch screen may be configured to detect a touch input position, a touched area, and touch input pressure in order to detect an input, such as an input gesture, performed by a user. Also, the touch screen may be configured to detect a real-touch and a proximity touch described below.

The real-touch, as recited herein refers to a case where a pointer actually touches a screen, and the "proximity-touch" refers to a case where a pointer does not actually touch the screen but is in proximity to the screen. The "proximity-touch" can be implemented by the pointer that is spaced apart from the screen and/or the display unit 120 by a predetermined distance. The pointer used herein refers to a tool for touching a particular portion of the displayed screen or proximity-touching the screen. Examples of the pointer include a stylus pen or a finger.

The input unit 130 generates input data for controlling an operation of terminal equipment, such as the terminal device 100. The input unit 130 may be configured of a key pad, a dome switch, a touch pad using static pressure and/or power outage, a jog wheel, a jog switch, a hardware button, and any other similar and/or suitable hardware and/or software element. In particular, when the touch pad constitutes a layered structure with the above-described display unit 120, the touch pad may be referred to as a touch screen.

In an embodiment of the present disclosure, the display unit 120 and/or the input unit 130 may receive a user's input by using touch input and may display the plurality of windows by adjusting the sizes of the plurality of windows according to the received input.

Figure 2:
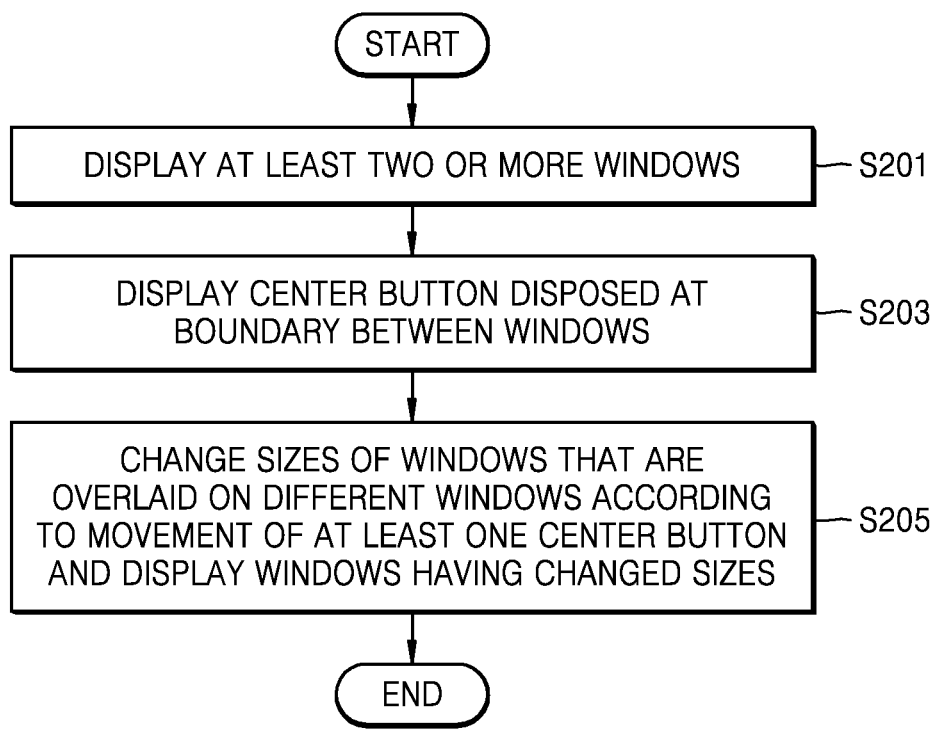
FIG. 2 is a flowchart of a method of displaying windows according to an embodiment of the present disclosure.

FIG. 2 is a flowchart of a method of displaying windows according to an embodiment of the present disclosure.

Referring to FIG. 2, in operation S201, the terminal device 100 may display at least two or more windows.

In an embodiment of the present disclosure, the plurality of windows, which may be referred to as the windows, may include at least one execution screen of an application. A work and/or an operation may be performed in a different window, such as a pop-up window, even in one application. Thus, the windows may include an execution window of an application on which each work and/or operation may be performed.

In operation S203, the terminal device 100 may display at least one center button disposed at a boundary line between the windows displayed in operation S201.

The at least one center button is used to change sizes of the windows according to the user's input, and the user may change the sizes of the windows by moving the at least one center button.

Furthermore, the at least one center button is disposed at a boundary line between the windows so that the windows, of which sizes are changed by moving the at least one center button, may be displayed. The at least one center button is disposed on a region in which boundary lines between two or more windows meet each other, and the windows, of which sizes are to be changed, may be determined according to a movement direction of the at least one center button among the two or more windows in-between which the at least one center button is disposed. The sizes of the determined windows may be changed according to movement of the at least one center button. For example, a window, in which a movement direction of the at least one center button corresponds to a direction in which the sizes of the windows are increased, may be determined as a window of which the size is to be changed.

In operation S205, the terminal device 100 may change the sizes of the windows that are overlaid on different windows according to movement of the at least one center button displayed in operation S203 and may display the windows having the changed sizes.

That is, the windows, of which sizes are changed according to movement of the at least one center button, may be overlaid on different windows displayed by the terminal device 100 and may be displayed. Different windows, except for the windows having the changed sizes, may be maintained while their sizes and positions are not changed.

After the at least one center button has been moved, the size of a window determined to be the window of which the size is to be changed, may be increased or decreased according to a movement direction of the at least one center button until the at least one center button is moved to a position where boundary lines between at least two windows meet each other. When the at least one center button is moved to a position where the boundary lines between at least two windows meet each other, the terminal device 100 may redetermine a window of which the size is to be changed, according to the movement direction of the at least one center line. Thus, the terminal device 100 may increase or decrease the size of the window determined according to the movement direction of the at least one center button and may display the increased or decreased size.

Figure 3:
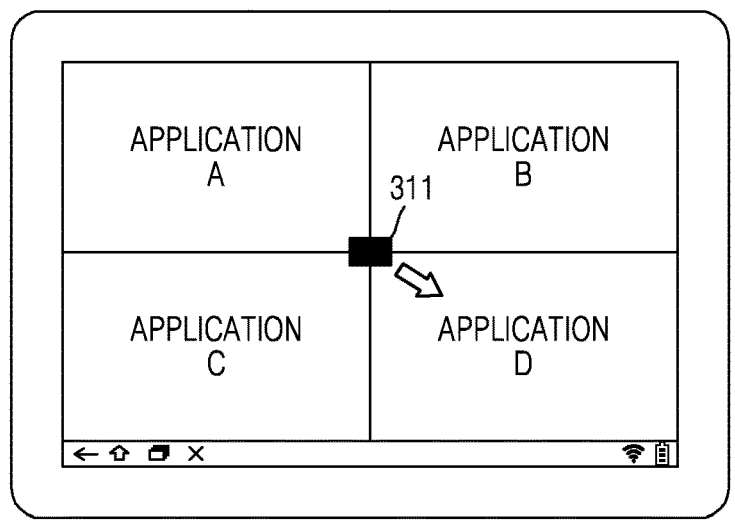
FIG. 3 is a view of an example of a method of displaying windows illustrated in FIG. 2 according to an embodiment of the present disclosure.
Figure 3:
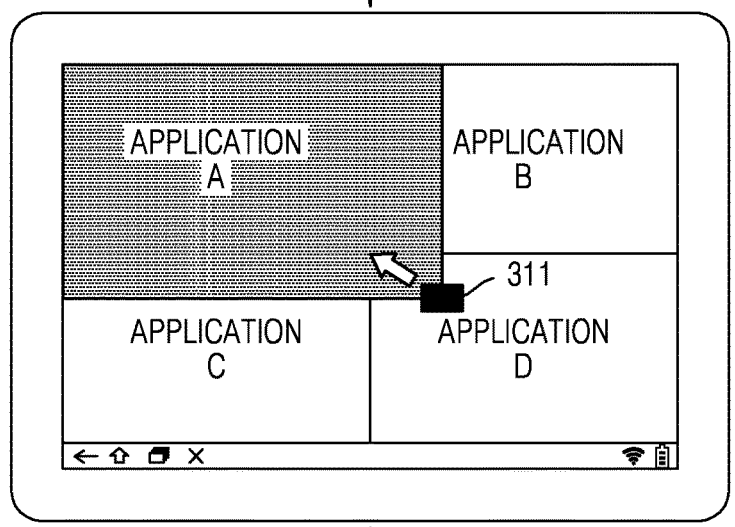
Figure 3:
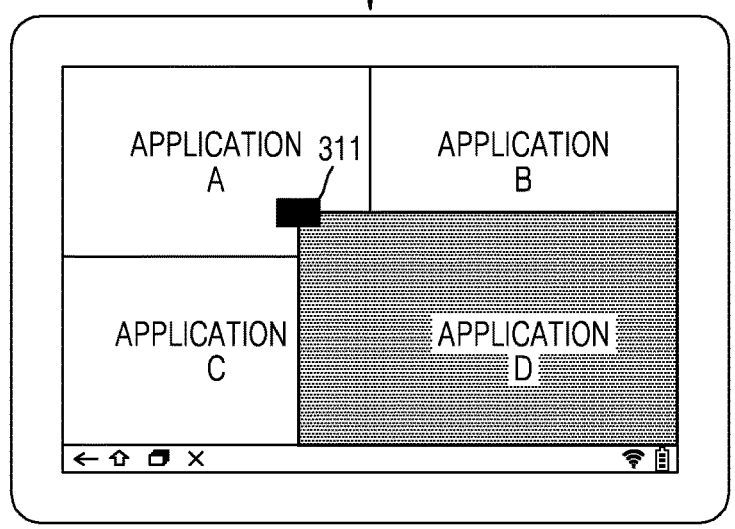

FIG. 3 is a view of an example of a method of displaying windows illustrated in FIG. 2 according to an embodiment of the present disclosure.

Referring to FIG. 3, screen 310, screen 320, and screen 330 illustrate examples in which windows are displayed using the method of displaying windows illustrated in FIG. 2.

In the screen 310, windows for displaying execution screens of applications A, B, C, and D may be displayed. Also, a center button 311 may be disposed at a position where boundary lines between windows meet each other. A window, of which the size is to be changed, may be determined according to the movement direction of the center button 311.

In the screen 320, when the center button 311 is moved in a direction of the arrow shown on the screen 310 according to the user's input, the size of a window for displaying an execution screen of the application A may be increased in the direction of the arrow and displayed. In this case, the center button 311 is dragged according to the user's input so that the center button 311 may be moved. That is, a window of the application A, in which the movement direction of the center button 311 is a direction in which the size of the window is increased, may be enlarged and displayed.

In the screen 330, when the center button 311 is moved in a direction of the arrow shown on the screen 320 according to the user's input, the size of the window for displaying the execution screen of the application A may be decreased. If the size of the window of the application A is the same as that of the initial screen 310, the center button 311 may be disposed at a position where boundary lines between at least two or more windows meet each other. Thus, a window, of which the size is to be changed, may be redetermined according to the movement direction of the center button 311, and a size of a window of the application D determined as a window of which the size is to be changed may be increased according to movement of the center button 311 in screen 330. The window of the application D may be determined as a window, of which the size is to be changed, as the movement direction of the center button 311 is a direction in which the size of the window of the application D is increased.

According to an embodiment of the present disclosure, as the center button 311 is moved, the size of the window may be changed. A window of which the size is to be changed depending on whether the movement direction of the center button 311 is the direction in which the size of a window is increased, may be determined according to settings.

Figure 4:
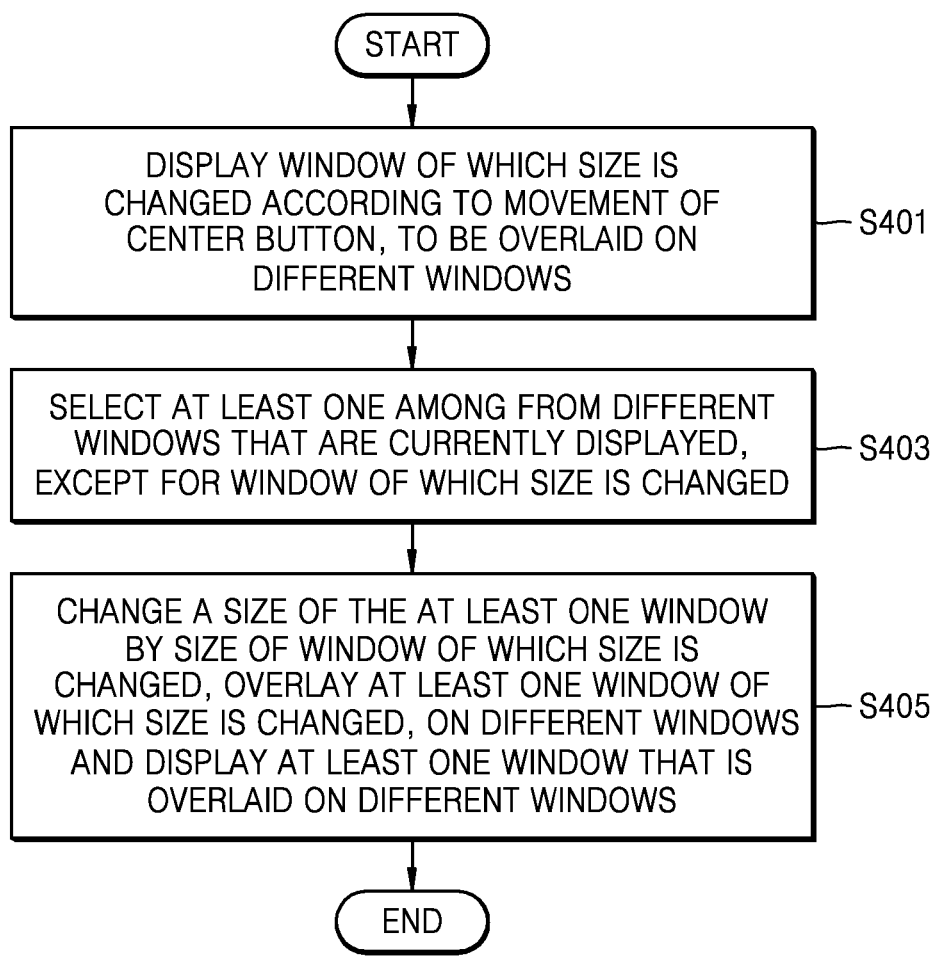
FIG. 4 is a flowchart of an operation of changing a focus window according to an embodiment of the present disclosure.

FIG. 4 is a flowchart of an operation of changing a focus window, according to an embodiment of the present disclosure.

Referring to FIG. 4, according to the operation of changing the focus window, a size of a window that is determined by the size of a window that is previously increased may be changed and displayed according to the user's input.

According to an embodiment of the present disclosure, the focus window is a window that is currently focused. The focus window may include a window on which a work and/or an operation is to be performed by the user and/or by another person and/or terminal, or a window on which a new work is to be performed as an event occurs. Windows may be displayed by the terminal device 100 based on the focus window that is a window in which a main work may be performed.

For example, the window that is increased according to the user's input may be regarded as a window on which a work may be performed by the user, and may be set as the focus window. If at least one window is set as the focus window, at least one window may be displayed as a main window on a display screen. For example, a region in which the focus window is displayed may be shown bright, and the other regions may be shown dark.

In operation S401, the terminal device 100 may display the window of which the size is changed according to movement of the center button, to be overlaid on different windows. For example, the terminal device 100 may display a window that is enlarged according to movement of the center button and which is overlaid on different windows. In this case, the window that is enlarged according to movement of the center button may be regarded as a window that is enlarged for work performance according to the user's input and thus may be set as the above-described focus window.

In operation S403, the terminal device 100 may select at least one from among different windows that are currently displayed, except for the window of which the size is changed in operation S401. For example, the terminal device 100 may select at least one window according to the user's input in which the displayed window region is tapped, e.g., the user performs a "tap" operation. In this case, the selected window may be regarded to be selected for work performance according to the user's input, and thus may be set as the above-described focus window.

Furthermore, the terminal device 100 may also select at least one window in which an event has occurred. In this case, the selected window may be selected to display the occurred event and to perform a work according to the occurred event, and thus may be set as the above-described focus window.

In operation S405, the terminal device 100 may change a size of the at least one window, selected in operation S403, by the size of the window of which the size is changed in operation S401, and may overlay the at least one window of which the size is changed, on different windows, and may display the at least one window that is overlaid on different windows. The window selected in operation S403 is set as the above-described focus window so that the size of the window may be changed by the size of the focus window that is previously set and may be displayed. For example, the terminal device 100 may change the size of the window selected in operation S403 by the size of the window enlarged in operation S401 and may display the window having the changed size.

In this case, the focus window that is previously set, i.e., the size and the position of the window that is set as the focus window as the size of the window is changed in operation S401, may be maintained even when the size of the window selected in operation S403 is changed. However, embodiments of the present disclosure are not limited thereto, and the size of the focus window that is previously set may be decreased by sizes of different windows.

Thus, according to an embodiment of the present disclosure, when a selected window, that is currently set as a focus window, exists without performing an operation of dragging and moving the center button, the size of the selected window may be changed by only performing a tapping operation for newly selecting the focus window.

Figure 5:
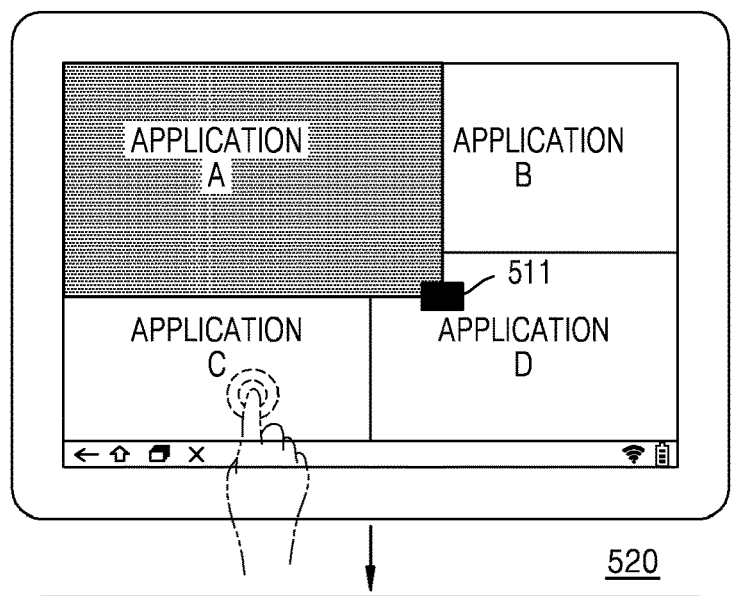
FIG. 5 is a view of an example of an operation of changing a focus window illustrated in FIG. 4 according to an embodiment of the present disclosure.
Figure 5:
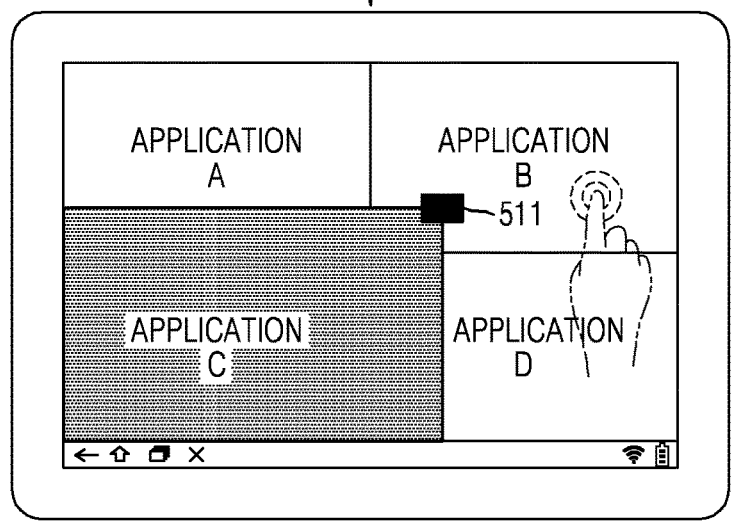
Figure 5:
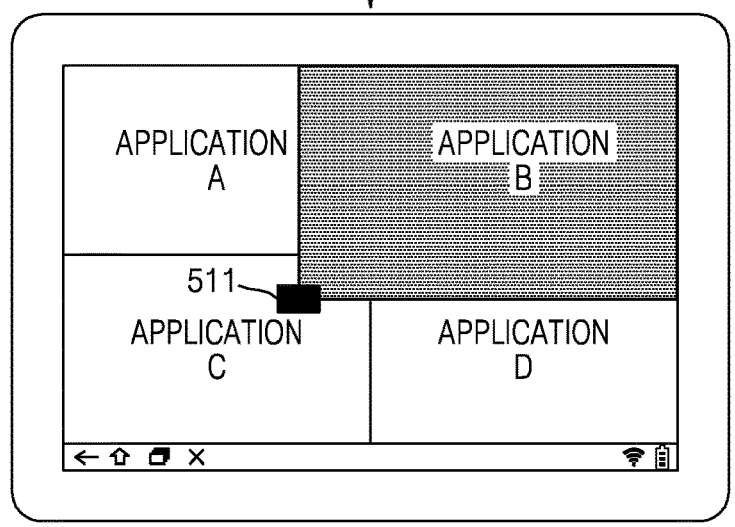

FIG. 5 is a view of an example of an operation of changing a focus window illustrated in FIG. 4 according to an embodiment of the present disclosure.

Referring to FIG. 5, a screen 510, a screen 520, and a screen 530 illustrate examples in which focused windows are changed, according to an embodiment of the present disclosure.

The screen 510 illustrates a state in which a previously-set focus window, including an execution screen of an application A, is enlarged. In this case, the focus window may be overlaid on different windows according to movement of a center button 511 and may be displayed. In this case, as shown on the screen 510, a window of an application C may be selected according to the user's input.

The screen 520 illustrates a state in which the window of the application C, which is selected according to the user's input on the screen 510, is set as a focus window and is enlarged. The newly-set focus window of the application C may be enlarged by the size of the previously-set focus window of the application A, and may be displayed. Also, as shown on the screen 520, a window of an application B may be selected according to the user's input.

The screen 530 illustrates a state in which the window of the application B, which is selected according to the user's input on the screen 520, is set as a focus window and is enlarged. The newly-set focus window of the application B may be enlarged by the size of the previously-set focus window.

Figure 6A:
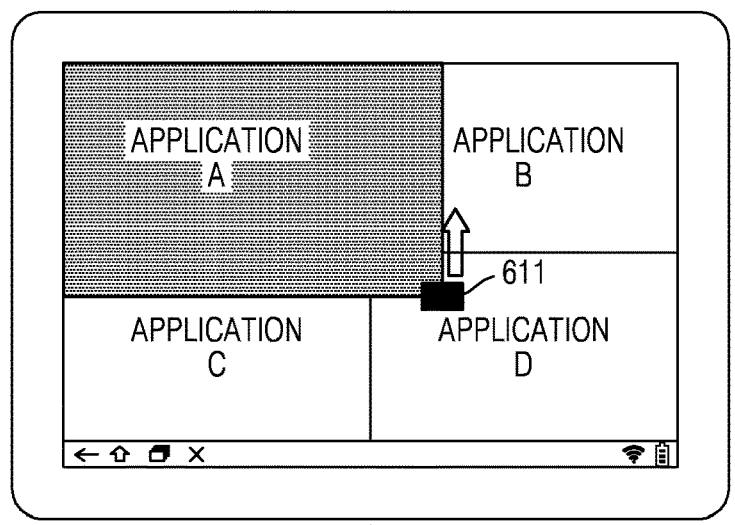
FIGS. 6A and 6B are views of examples of a method of displaying windows, whereby an aspect ratio of a window is maintained and sizes of windows are changed according to an embodiment of the present disclosure.
Figure 6A:
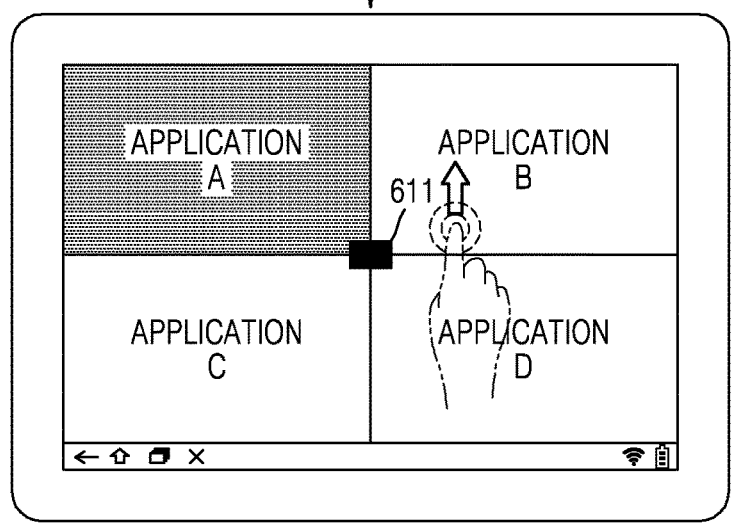
Figure 6A:
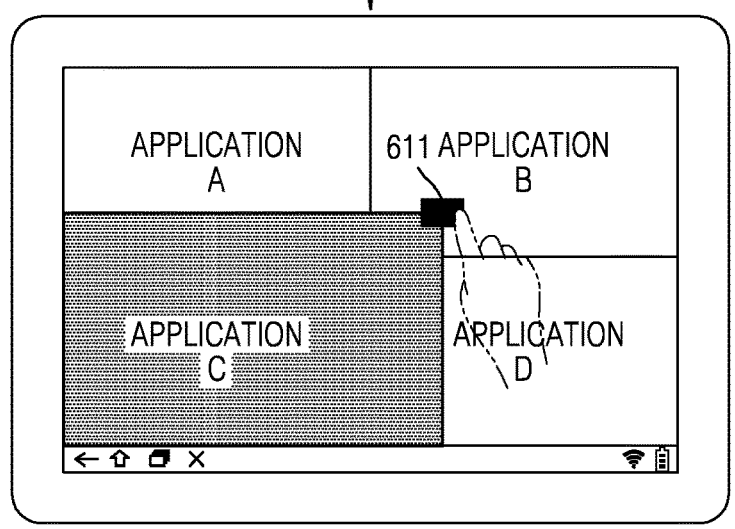
Figure 6B:
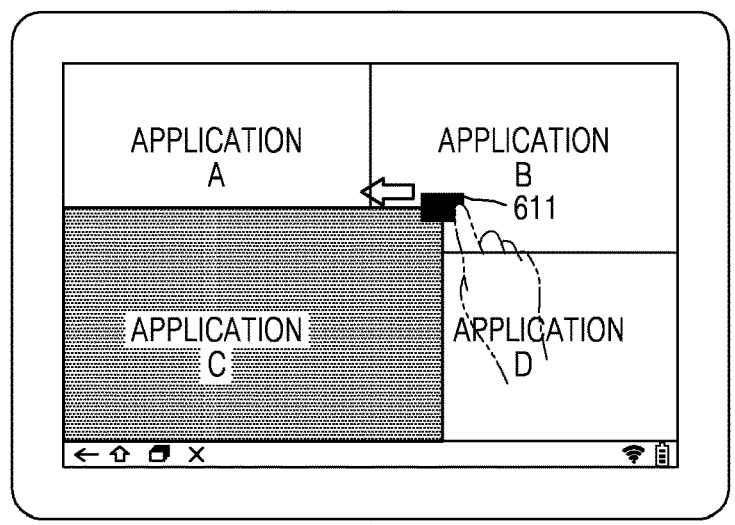
Figure 6B:
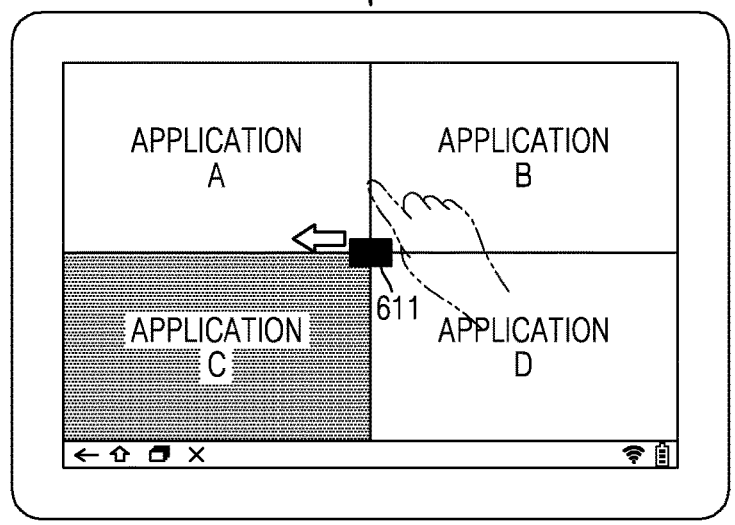
Figure 6B:
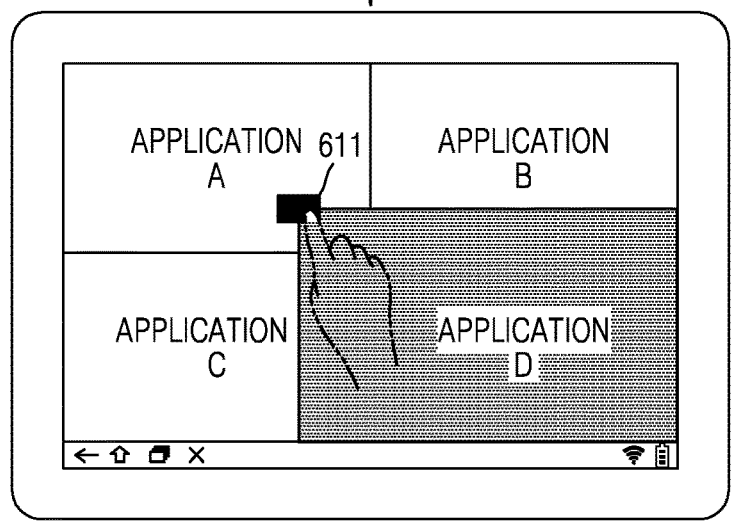

FIGS. 6A and 6B are views of examples of a method of displaying windows, whereby an aspect ratio of the window is maintained and sizes of windows are changed, according to an embodiment of the present disclosure.

Referring to FIGS. 6A and 6B, screens 610 through 660 illustrate examples in which sizes of windows are changed by using the method of displaying the windows illustrated in FIG. 2 while the aspect ratio of a window size is maintained.

According to an embodiment of the present disclosure, the aspect ratio of a window may be set according to content displayed on each window of each application. For example, the terminal device 100 may determine the aspect ratio of the window according to an aspect ratio of content displayed on the window so that the content may be displayed without being cut even when the size of the window is changed.

Referring to the screen 610 of FIG. 6A, as a center button 611 is moved according to the user's input, the size of a window of an application A may be changed.

In the screens 610 through 660, the center button 611 may be moved in at least four directions, such as left up, right up, right down, and left down, so that the aspect ratio of the window may be maintained. If the user's input to move the center button 611 from down to up is received, an x-coordinate value of the window, i.e., a width of the window, may be adjusted according to the aspect ratio based on a y-coordinate value of an input position.

When the center button 611 is moved in a direction of the arrow shown on the screen 610, then, as illustrated on the screen 620, the size of the window of the application A may be decreased. In this case, as the size of the window of the application A is changed while the aspect ratio is maintained, a position of a window region that the user taps may be different from that of a region in which the center button 611 is displayed. That is, the center button 611 is disposed at the same position as that of the y-coordinate value of the position of the window region that the user taps so that the size of the window of the application A may be adjusted. The x-coordinate value of the center button 611 may be determined according to the set aspect ratio.

When the center button 611 is moved in a direction of the arrow shown on the screen 620, then, as illustrated on the screen 630, the size of a window of an application C may be increased. In this case, the size of the window of the application C may be changed while the aspect ratio of the window is maintained. That is, the center button 611 is disposed at the same position as that of the y-coordinate value of the position of the window region that the user taps so that the size of the window of the application C may be adjusted. The x-coordinate value of the center button 611 may be determined according to the set aspect ratio.

Thus, in an embodiment of the present disclosure, when the size of the window is adjusted, the size of the window may be changed while the aspect ratio of the window is maintained, such that the entire execution screen of the application may be watched without being cut.

As shown in the screen 640 of FIG. 6B, the size of the window of the application C may be changed while the center button 611 is moved according to the user's input. As shown in the screens 640 through 660 of FIG. 6B, when the user's input to move the center button 611 from right to left is received, the y-coordinate value of the window, i.e., a length of the window, may be adjusted according to the aspect ratio based on an x-coordinate value of the input position.

When the center button 611 is moved in a direction of the arrow shown on the screen 640, then, as illustrated on the screen 650, the size of the window of the application C may be decreased. In this case, as the size of the window of the application C is changed while the aspect ratio of the window is maintained, the position of the window region that the user taps may be different from a region in which the center button 611 is displayed.

When the center button 611 is moved in a direction of the arrow shown on the screen 650, then, as illustrated on the screen 660, the size of a window of an application D may be increased. In this case, the size of the window of the application D may be changed while the aspect ratio of the window is maintained.

Figure 7:
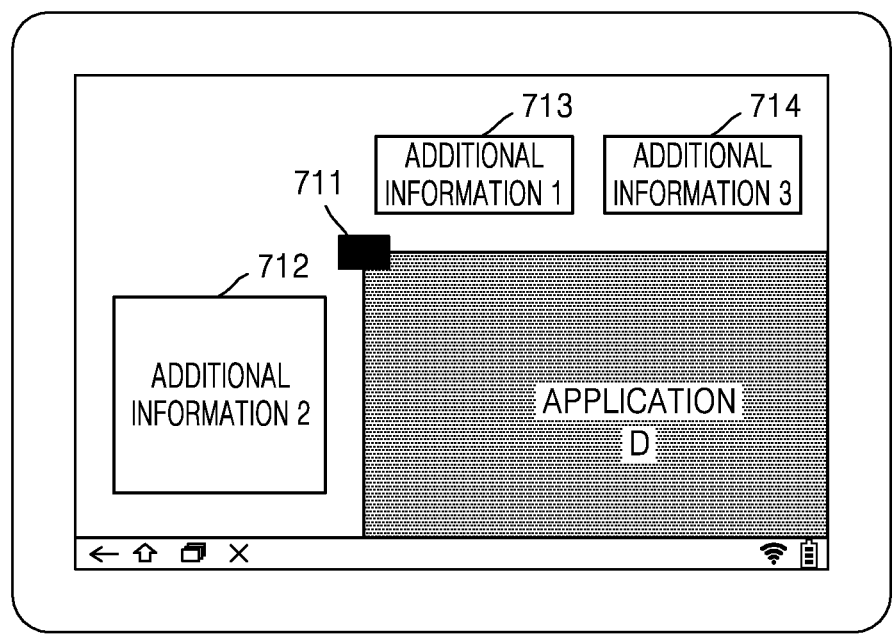
FIG. 7 is a view of an example in which a window set as a focus window is displayed according to an embodiment of the present disclosure.

FIG. 7 is a view of an example in which a window set as a focus window is displayed, according to an embodiment of the present disclosure.

Referring to FIG. 7, when the window of the application D is set as a focus window of which the size may be changed according to movement of a center button 711, other regions than a region in which the focus window is displayed, may be shown dark. In this case, partial screens of the remaining windows may appear in the other regions, but their utilization is lowered.

Thus, when the size of at least one window is increased by a predetermined size in order to improve utilization of the other regions, additional information, which may include additional information 2 712, additional information 1 713, and additional information 3 714, about an application displayed on the focus window may be displayed in the other regions.

For example, when a window set as the focus window includes a dial screen for dialing, the terminal device 100 may display additional information, such as frequent telephone numbers, a telephone book, and an up-to-date call list, or any other similar and/or suitable type of information that may be displayed on the terminal device 100, in the other regions than the region in which the focus window is displayed. Thus, utilization of the other regions than the region in which the focus window is displayed may be improved.

Figure 8:
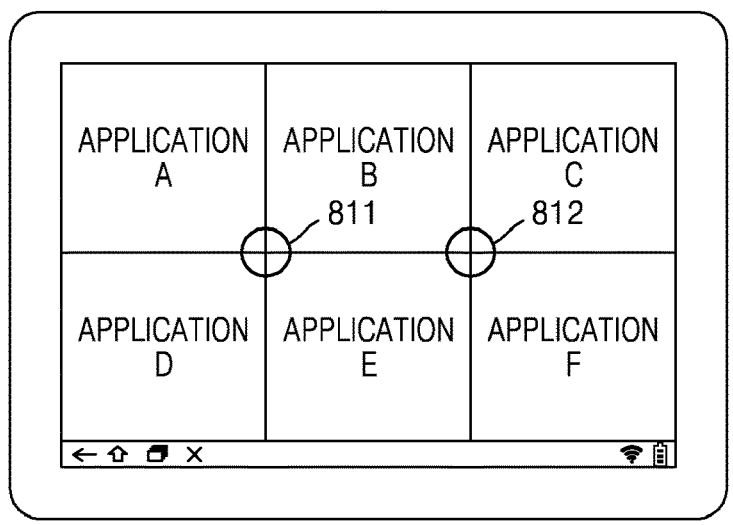
FIG. 8 is a view of an example in which a window is displayed when a screen is split into 6 parts, 9 parts, and 16 parts according to an embodiment of the present disclosure.
Figure 8:
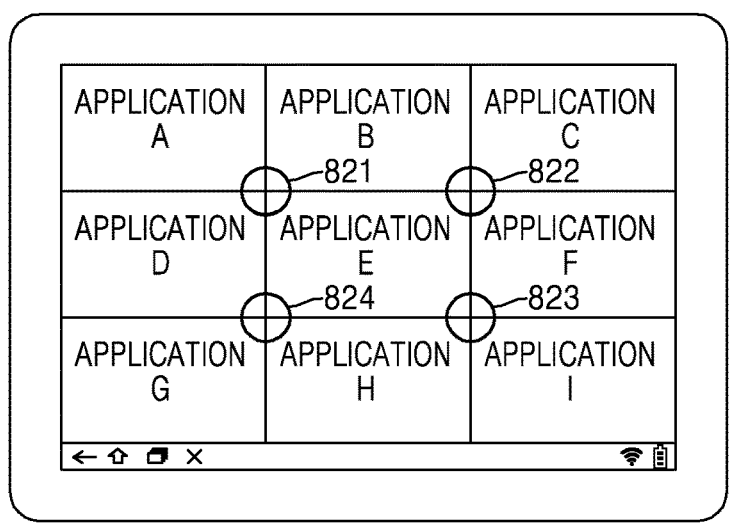
Figure 8:
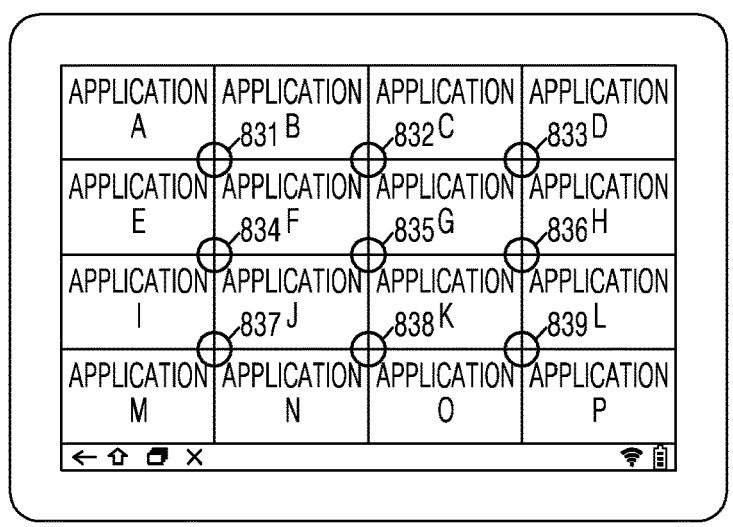

FIG. 8 is a view of an example in which a window is displayed when a screen is split into 6 parts, 9 parts, and 16 parts, according to an embodiment of the present disclosure.

Referring to FIG. 8, a view of an example in which the window is displayed when a screen 810 is split into 6 parts, a screen 820 is split into 9 parts, and a screen 830 is split into 16 parts, is shown.

Referring to the screen 810, center buttons 811 and 812 may be disposed on portions in which boundaries of windows meet each other. The size of each window may be changed according to movement of the center buttons 811 and 812 like in movement of the center button 311 on the above-described four-split screen shown in FIG. 3. That is, the size of a window, in which directions of the center buttons 811 and 812 are directions in which the sizes of the windows are increased, may be changed and displayed. For example, when the center button 811 is moved in a direction of an application E, the size of a window of an application A may be increased.

Referring to the screen 820, center buttons 821, 822, 823, and 824 may be disposed on positions in which boundaries of windows meet each other. Similarly, in the screen 830, center buttons 831, 832, 833, 834, 835, 836, 837, 838, and 839 may be disposed on positions in which boundaries of windows meet each other. Sizes of windows displayed on the screens 820 and 830 may also be changed according to movement of the center buttons 821, 822, 823, and 824 and the center buttons 831, 832, 833, 834, 835, 836, 837, 838, and 839 like in movement of the center button of the above-described screens that are split into 4 parts and 6 parts.

Furthermore, features such as the size of a window being changed according to the user's input in the above-described window that is split into 4 parts, the size of the window being changed while the aspect ratio of the window is maintained, the window of which the size is changed being set as the focus window, and additional information about the focus window being displayed in the other regions than a region in which the focus window is displayed, may be applied to windows that are split into 6 parts, 9 parts, and 16 parts.

Furthermore, according to an embodiment of the present disclosure, even in windows split using split methods, except for windows that are split into 4 parts, 6 parts, 9 parts, and 16 parts, as described above, at least one center button may be disposed on boundary lines between windows so that windows having sizes changed according to movement of the center button may be displayed. The center button may be disposed on a region in which boundary lines between two or more windows meet each other, and a window, of which the size is to be changed according to a movement direction of the center button, may be determined from among the two or more windows between which the center button is disposed. The size of the determined window may be changed according to movement of the center button. For example, a window, in which the movement direction of the center button is a direction in which the size of the window is increased, may be determined as a window of which the size is to be changed.

According to an embodiment of the present disclosure, a plurality of windows may be displayed by a terminal device having a limitation in the size of a screen and thus may be conveniently used.

According to an embodiment of the present disclosure, when the sizes of the plurality of windows are adjusted using a center button, the aspect ratio of each of the sizes of the windows may be maintained so that all contents may be identified in the windows regardless of a position of the center button.

An embodiment of the present disclosure can also be embodied as computer readable codes on a computer-readable recording medium that may be processed by a computer system, an electronic device, and/or including any devices having an information processing function, such as a controller, a processor, an integrated circuit (IC), and any other similar and/or suitable hardware element. The computer-readable recording medium is any data storage device that can store data which can be thereafter read by a computer system. Examples of the computer-readable recording medium include read-only memory (ROM), random-access memory (RAM), compact disc ROMs (CD-ROMs), magnetic tapes, floppy disks, optical data storage devices, etc.

As described above, according to an embodiment of the present disclosure, a plurality of windows may be displayed and used conveniently in a mobile device in which there is a limitation in the size of a screen.

According to an embodiment of the present disclosure, when sizes of the plurality of windows are adjusted using a center button, an aspect ratio of the window size may be maintained so that all contents may be identified without being cut in the windows regardless of a position of the center button.

It should be understood that the embodiments of the present disclosure described therein should be considered in a descriptive sense only and not for purposes of limitation. Descriptions of features or aspects within each embodiment of the present disclosure should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying a plurality of windows, the method comprising:
    displaying, on a display, a first window including a first execution screen of a first application at a first size, a second window including a second execution screen of a second application at the first size, and a center button disposed to simultaneously overlap a first portion of the first window and a first portion of the second window;
    identifying, by at least one processor, the first window as a focus window in response to determining that a movement direction of an input associated with the center button corresponds to a direction indicating an increase in size of the first window;
    controlling, by the at least one processor, the display to display the first window at a second size, different from the first size according to movement of the center button based on the input associated with the center button, wherein when the first window is displayed at the second size, the first window overlays the second window and the center button is displayed to overlap the first portion of the first window and a second portion of the second window different from the first portion of the second window;
    in response to receiving an input for selecting the second window, identifying the second window as the focus window such that the focus window is changed from the first window to the second window; and
    controlling the display to display the second window mat the second size according to the changing of the focus window from the first window to the second window and the center button to overlap the first portion of the second window and a second portion of the first window different from the first portion of the first window.

2. The method of claim 1, wherein the second window as a non-focus window, is displayed while a size and a position of the second window are fixed according to movement of the center button.

3. The method of claim 1, further comprising:
    in response to receiving an input associated with moving the center button to a region in which the at least one boundary between the first window and the second window meet each other:
        changing again the focus window among the first window and the second window, and
        changing a size of the redetermined focus window according to movement of the center button.

4. The method of claim 1, further comprising:
    determining an aspect ratio of the first size of the first window based on the input associated with the center button; and
    determining the second size of the first window according to the determined aspect ratio and the movement of the center button.

5. The method of claim 1, further comprising:
    identifying the first window as the focus window in response to detecting a movement direction of the center button in a direction in which the size of a window is increased when the second window is identified as the focus window.

6. The method of claim 1, further comprising displaying additional information about the focus window in other regions than a region in which the focus window is displayed.

7. The method of claim 6, wherein the additional information is at least one of frequent telephone numbers, a telephone book, or an up-to-date call list.

8. The method of claim 1, wherein the center button is disposed between boundary lines of at least two, and no more than four, of the plurality of displayed windows.

9. The method of claim 1, wherein the focus window is the only window of the plurality of windows configured to receive an input corresponding to an operation of the executed application displayed in the focus window when the focus window is identified.

10. A terminal device comprising:
    a display; and
    at least one processor configured to:
        control the display to display a first window including a first execution screen of a first application at a first size, a second window including a second execution screen of a second application at the first size, and a center button disposed to simultaneously overlap a first portion of the first window and a first portion of the second window,
        identify a first window as a focus window in response to determining that a movement direction of an input associated with the center button corresponds to a direction indicating an increase in size of the first window,
        control the display to display the first window at a second size, different from the first size according to movement of the center button based on the input associated with the center button, wherein when the first window is displayed at the second size, the first window overlays the second window and the center button is displayed to overlap the first portion of the first window and a second portion of the second window different from the first portion of the second window,
        in response to receiving an input for selecting the second window, identify the second window as the focus window such that the focus window is changed from the first window to the second window, and
        control the display to display the second window at the second size according to the changing of the focus window from the first window to the second window and the center button to overlap the first portion of the second window and a second portion of the first window different from the first portion of the first window.

11. The terminal device of claim 10, wherein the second window as a non-focus window is displayed while a size and a position of the second window are fixed according to movement of the center button.

12. The terminal device of claim 10, wherein; the at least one processor is further configured to:
in response to receiving an input associated with moving the center button to a region in which the at least one boundary between the first window and the second window meet each other:
change again the focus window among the first window and the second window, and
change a size of the redetermined focus window according to movement of the center button.

13. The terminal device of claim 10, wherein the at least one processor is further configured to:
determine an aspect ratio of the first size of the first window based on the input associated with the center button, and
determine the second size of the first window according to the determined aspect ratio and the movement of the center button.

14. The terminal device of claim 10, wherein the at least one processor is further configured to identify the first window as the focus window in response to detecting a movement direction of the center button in a direction in which the size of a window is increased when the second window is identified as the focus window.

15. The terminal device of claim 10, wherein the at least one processor is further configured to control the terminal device to display additional information about the focus window in other regions than a region in which the focus window is displayed.

16. The terminal device of claim 15, wherein the additional information is at least one of frequent telephone numbers, a telephone book, or an up-to-date call list.

17. The terminal device of claim 10, wherein the center button is disposed between boundary lines of at least two, and no more than four, windows displayed on the display.

18. The terminal device of claim 10, wherein the focus window is the only window of the plurality of windows configured to receive an input corresponding to an operation of the executed application displayed in the focus window when the focus window is identified.

19. A method of displaying a plurality of windows, the method comprising:
displaying, on a touchscreen display, a first window at a first size, a second window, and a visual indicator, the visual indicator being disposed to overlap a portion of the first window and a portion of the second window;
in response to receiving an indication that a first input associated with the visual indicator is received at the touch screen display:
identifying a start location of the first input and an end location of the first input based on the indication,
identifying the first window as a focus window based on the start location of the first input and the end location of the first input,
determining to change a size of the first window from the first size to a second size different from the first size based on the end location of the first input, and
controlling the touchscreen display to display the first window at the second size, the second window, and the visual indicator, the visual indicator being displayed to overlap the portion of the first window at a location associated with the end location of the first input; and
in response to receiving an indication that a second input associated with the second window is received at the touch screen display when the first window is identified as the focus window:
identifying the second window as the focus window based on the second input,
determining to change a size of the second window to the second size based on identifying the second window as the focus window, and
controlling the touchscreen display to display the first window at the first size, the second window at the second size, and the visual indicator, the visual indicator being displayed to overlap the portion of the second window.

20. The method of claim 19, wherein only one of the plurality of windows is capable of being identified as the focus window at one time.

* * * * *